July 30, 1968    E. J. KJELLSTROM    3,394,606
GRIP PULLEY
Filed Jan. 5, 1968

INVENTOR.
ELVING J. KJELLSTROM
BY Joseph G. Werner
ATTORNEY

United States Patent Office 3,394,606
Patented July 30, 1968

3,394,606
GRIP PULLEY
Elving J. Kjellstrom, 458 Oak St.,
Oregon, Wis. 53575
Continuation-in-part of application Ser. No. 573,448,
Aug. 17, 1966. This application Jan. 5, 1968, Ser.
No. 695,979
3 Claims. (Cl. 74—230.5)

ABSTRACT OF THE DISCLOSURE

A fin-type pulley for gripping a flexible drive belt in an undulating manner to maintain faithful response. The belt engaging surface of each of the fins has the configuration of a section of a wall of a cone which has its axis at an angle to the axis of rotation of the pulley.

CROSS-REFERENCE OF RELATED APPLICATION

This application is a continuation-in-part of my earlier application, Ser. No. 573,448 filed Aug. 17, 1966, now abandoned.

BACKGROUND OF THE INVENTION

Field of the invention

This invention relates to pulleys and more particularly to a finned pulley for gripping a drive belt in an undulating manner.

DESCRIPTION OF THE PRIOR ART

Conventional pulleys generally comprise a pair of formed webs which are spot welded together to provide a continuous peripheral V-shaped groove for receiving a drive belt commonly called a V-belt having a trapezoidal cross-section or a drive belt of round cross-section. While this type of pulley has for a long time been and is presently extensively used throughout the world, it has several shortcomings. It does not always maintain faithful response with the belt, particularly after the belt has been in use for a period of time and has become somewhat worn or stretched. The groove and belt pick up dirt, grease, and the like over a period of time which speeds the deterioration of the rubber composition of the belt. In addition, these conventional pulleys are relatively expensive because the double web and continuous groove require the use of a considerable amount of metal and the labor involved in welding the two webs together to form the pulley is very costly.

In the past various attempts have been made to design fin-type belt pulleys to eliminate slippage between the pulley and the drive belt and to prolong the life of the belt. One such attempt to improve the frictional relation of the belt with the pulley has been to provide a pulley having a plurality of cylindrical pegs spaced about the circumference of the web of the pulley in an alternating divergent manner which provides for undulation of the belt as it passes around the pulley. While this type of pulley provides somewhat improved response between the belt and pulley, the life of the belt is relatively short because the curvature of the thin cylindrical pegs is much greater than the curvature of the undulating belt and thereof the belt is unsupported except at pressure contact points where the belt is engaged by the pegs. The cylindrical surfaces of the pegs do not conform sufficiently close to the curvature of the belt to minimize wearing of the belt. Furthermore, this peg type grip pulley is even more expensive to produce than the conventional double web continuous groove pulley.

SUMMARY OF THE INVENTION

In brief, my invention comprises a new and improved pulley having circumferentially spaced curved fins for gripping a drive belt in an undulating manner to prevent slippage and minimize wearing of the belt. Because of the undulating manner in which the belt is gripped, less belt tension is needed to maintain faithful response than in conventional pulleys.

The pulley has a web and integral groove forming fins which may be stamped from a unitary sheet of metal for very low-cost production.

A first series of circumferentially spaced fins extend divergently from the plane of the web and a second series of fins positioned in alternating relation with the fins of said first series and extend away from the first series to form a peripheral groove for gripping a drive belt in an undulating manner. The inner surface of each of the fins has substantially the curved configuration of a section of the wall of a cone having its axis forming an angle with the axis of rotation of the pulley. The vertex angle of said cone is less than the vertex angle of a second cone which would be formed by swinging a radial median line drawn on the inner surface of the fin in a circle about the axis of rotation of the pulley.

My pulley provides a self-cleaning action for the belt by causing the belt to be flexed and unflexed laterally as it enters and leaves the pulley which tends to dislodge dirt and the like from the sides of the belt.

Further objects, features and advantages of my invention will be apparent from the following detailed description taken in conjunction with the accompanying drawings showing a preferred embodiment exemplifying the principles of my invention.

DESCRIPTION OF THE PREFERRED EMBODIMENT

Figure 1:
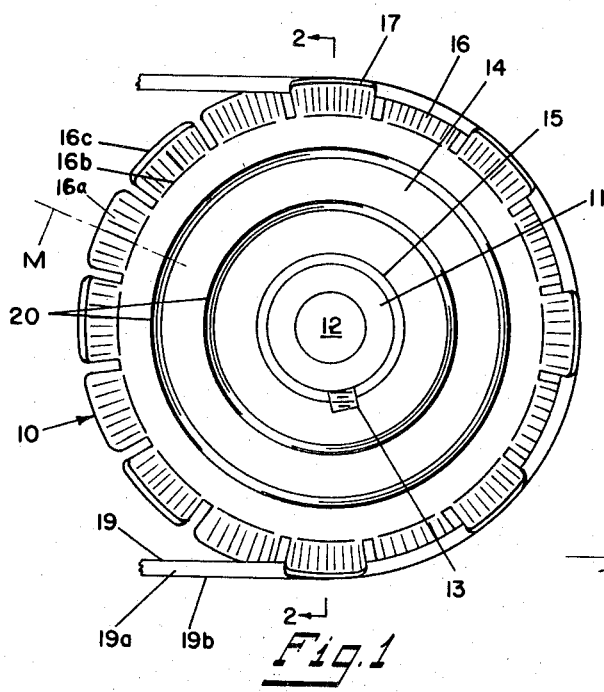
FIG. 1 is a side elevational view of a pulley embodying my invention.

Referring now more particularly to the drawings wherein like numerals refer to like parts throughout the several views, my new and improved pulley is generally designated at 10 in FIG. 1. Pulley 10 has a hollow hub 11 adapted to receive a shaft 12. The hub 11 may be secured to shaft 12 by any suitable means, such as for example, screw 13. A radially extending circular web 14 is rigidly secured to hub 11 by suitable means. In the particular pulley 10 shown in the drawings for exemplification, the hub 11 and web 14 are made of steel and are secured together by welding as shown by bead 15.

Figure 2:
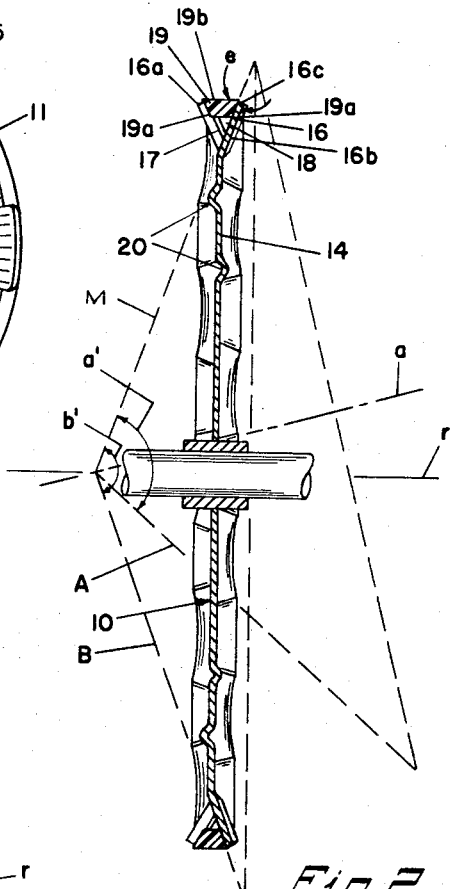
FIG. 2 is a cross-sectional view taken along line 2—2 of FIG. 1 and illustrates the conical shape of the fins.

The pulley has a first series of circumferentially spaced fins 16 extending divergently from the plane of the web 14 as shown in FIG. 2. A second series of circumferentially spaced fins 17 extend divergently from the plane of the web and away from the first series of fins. Fins 16 are alternately arranged with respect to fins 17 for providing a discontinuous peripheral groove 18 for gripping the belt 19 in an undulating manner.

The inner surfaces 16a and 17a, respectively, of each of the fins in the two series of fins 16 and 17 have the configuration of a section of the wall of a cone. For example, as illustrated in regard to fin 16 in FIG. 2, the inner surface 16a has the configuration of a section of a first cone A (shown in dashed lines) having its axis a forming an angle with the axis of rotation r of the pulley. The vertex angle a' of cone A is less than the vertex angle b' of a second cone B which would be formed by swinging a median line (such as shown at M in FIG. 1) drawn on the inner surface of the fin in a circle about the axis of rotation r of the pulley. The inner surface, that is, the belt engaging surface of each fin has a sharper degree of curvature than cone B. Having the configuration of a section of the wall of cone, the inner surface has a sharper degree of curvature at its base 16b than at its peripheral edge 16c.

When designed for use with a V-belt such as 19, that is, a belt having a conventional trapezoidal cross-section, such as shown in the drawings, the fins should be bent outward so that the vertex angle b' of the cone B is twice the acute angle e which either of the sides 19a of the belt 19 forms with the base 19b of the belt so that the inner surfaces of the fins conform very closely to the shape of the sides 19a of the belt. When designed for use with belts of circular cross-section, this angle b' is less critical.

Figure 3:
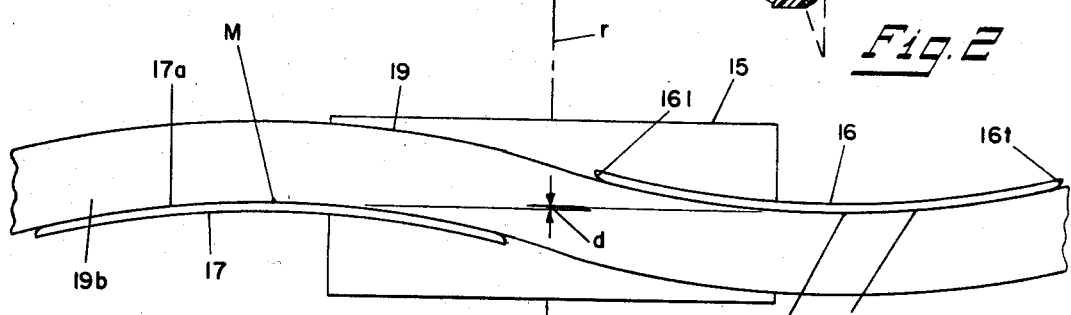
FIG. 3 is an enlarged fragmentary edge view of my invention showing how the fins of the pulley impart a curvature to the drive belt which is substantially the same as the curvature of the fins.

FIG. 3 shows how the belt undulates between adjacent fins 16 and 17 and how the fins engage and support the belt along substantially their entire surfaces 16a and 17a except for the leading and trailing edges of the fins which are coined or radiused as shown at the leading and trailing edges 16l and 16t of fin 16 to prevent wearing of the belt. The distance d between the median lines M drawn on the inner surfaces of adjacent fins, measured at the base 19b of the belt 19 parallel to the axis of rotation of the pulley, is less than the width of the base of the belt to provide for gripping of the belt in an undulating manner. The curvature imparted to the belt is somewhat exaggerated in FIG. 3 for exemplification. The particular curvature of the inner surfaces of the fins of my invention, complementing the gradual smooth curvature of the sides of the belt, eliminates contact pressure points and, thus, minimizes wear on the belt and greatly prolongs the life thereof.

A very important advantage of the unique construction of my pulley is that the drive belts may be run with considerably less tension than in conventional continuous groove pulleys which significantly reduces wear on the belts. This is particularly true when used with round cross-section belts which ordinarily must be run under greater tension than trapezoid cross-section belts to prevent slippage and maintain faithful response.

Another important advantage of my new pulley is that it costs much less to produce than conventional pulleys because of savings in both material and labor. The web 14 and integral fins 16 and 17 can be readily stamped from a unitary sheet of suitable metal. It is also understood that the pulley may be die cast or, if desired, it may be molded from plastic.

Ribs such as 20 and radially extending ribs (not shown) may be stamped in or otherwise formed on the web to provide additional strength where desired.

While the pulley 10 shown has a total of sixteen alternating gripping fins, my invention is not limited to a pulley having only that number of sections and more or less gripping fins may be provided as desired for various uses and belt sizes.

It is understood that my invention is not confined to the particular construction and arrangement of parts herein illustrated and described, but embraces all such modified forms thereof as may come within the scope of the following claims.

I claim:
1. A pulley for a flexible drive belt, said pulley comprising:
   (a) a hub for receiving a shaft along the axis of rotation of the pulley,
   (b) a substantially flat circular web attached to said hub,
   (c) a first series of circumferentially spaced fins extending divergently from the plane of said web,
   (d) a second series of circumferentially spaced fins extending divergently from the plane of said web away from said first series of fins and being alternately arranged with respect to said first series of fins, and
   (e) each of said fins having an inner surface having substantially the configuration of a section of the wall of a first cone having its axis forming an angle with the axis of rotation of the pulley, said first cone having a vertex angle which is less than the vertex angle of a second cone formed by swinging a median line drawn on the inner surface of the fin in a circle about the axis of rotation of the pulley.

2. A pulley for a flexible V-belt having a base and a pair of sides each forming an acute angle with the base, said pulley comprising:
   (a) a hub for receiving a shaft along the axis of rotation of the pulley,
   (b) a substantially flat circular web attached to said hub,
   (c) a first series of circumferentially spaced fins extending divergently from the plane of said web,
   (d) a second series of circumferentially spaced fins extending divergently from the plane of said web away from said first series of fins and being alternately arranged with respect to said first series of fins, and
   (e) each of said fins having an inner surface having substantially the configuration of a section of the wall of a first cone having its axis forming an angle with the axis of rotation of the pulley, said first cone having a vertex angle which is less than the vertex angle of a second cone formed by swinging a median line drawn on the inner surface of the fin in a circle about the axis of rotation of the pulley, the vertex angle of said second cone being twice the acute angle which one of the sides of the belt forms with the base of the belt.

3. The pulley as specified in claim 2 wherein the distance between median lines drawn on the inner surfaces of adjacent fins measured at the base of the belt parallel to the axis of rotation of the pulley is less than the width of the base of the belt.

References Cited
UNITED STATES PATENTS

| 1,668,778 | 5/1928 | Menningen | 74—230.5 XR |
| 2,916,925 | 12/1959 | Padrick | 74—230.5 |

FOREIGN PATENTS

| 79,396 | 8/1950 | Czechoslovakia. |
| 181,065 | 2/1907 | Germany. |
| 320,743 | 8/1902 | France. |

FRED C. MATTERN, JR., *Primary Examiner.*

J. A. WONG, *Assistant Examiner.*